United States Patent [19]
Wagers, Jr. et al.

[11] 3,838,766
[45] Oct. 1, 1974

[54] CAPSULE INSPECTION APPARATUS AND METHOD

[75] Inventors: William D. Wagers, Jr.; Willard J. Vandenberg, both of Indianapolis; Robert L. Bollman, Mooresville; Robert E. Ramsey, Indianapolis; Daniel G. Swisher, Indianapolis; John E. Taylor, Jr., Indianapolis, all of Ind.

[73] Assignee: Eli Lilly and Company, Indianapolis, Ind.

[22] Filed: Jan. 31, 1973

[21] Appl. No.: 328,403

Related U.S. Application Data
[62] Division of Ser. No. 105,262, Jan. 11, 1971.

[52] U.S. Cl. .................................................. 198/255
[51] Int. Cl. ............................................ B65g 47/24
[58] Field of Search ...................... 209/84, 92, 102; 198/33 AA

[56] References Cited
UNITED STATES PATENTS
3,348,680  10/1967  Mathews ........................ 209/102 X
3,556,282  1/1971  Moeltzner ..................... 198/33 AA

*Primary Examiner*—Richard A. Schacher
*Attorney, Agent, or Firm*—Trask, Jenkins and Hanley

[57] ABSTRACT

Apparatus for handling medicinal capsules at high rates, e.g., 900 per minute, to present them in succession, in uniform orientation, at an inspection position and there spin them on their axes to expose their entire surfaces for inspection as by optical means. Bulk capsules are loaded from a hopper into the cavities of a chain conveyor running up an incline. A pair of spaced rolls define a feed slot from the hopper to the conveyor along the line of cavity travel. The rolls rotate outward to move misaligned capsules away, induced air flow urges aligned capsules through the slot and into the cavities, and an agitator bar dislodges capsules from double-filled cavities.

To rectify body-forward capsules to cap-forward position, each cavity has a bottom slot between side ribs, which will pass the body but retain the cap of the capsule. As the cavity moves off the end of a capsule-supporting rail, a forward capsule body is swung downward by gravity and induced airflow through the slot to tilt the capsule to an upright position. A brush then tilts the upright capsule forward, and a camming belt moves it to a cap-forward position in its cavity.

Pick-up transfer fingers in the upper conveyor sprocket wheel are advanced through the cavities to lift the capsules therefrom on suction seats and transfer them to an inspection head at a loading station. The inspection head has a ring of parallel rolls, each pair of which forms a groove in which a capsule is retained by air flow. The head indexes to carry capsules from the loading station to an inspection station where rotation of the rolls spins each capsule on its axis to expose its entire surface for optical inspection. The capsules are discharged at a reject or accept station, depending on the inspection result.

14 Claims, 20 Drawing Figures

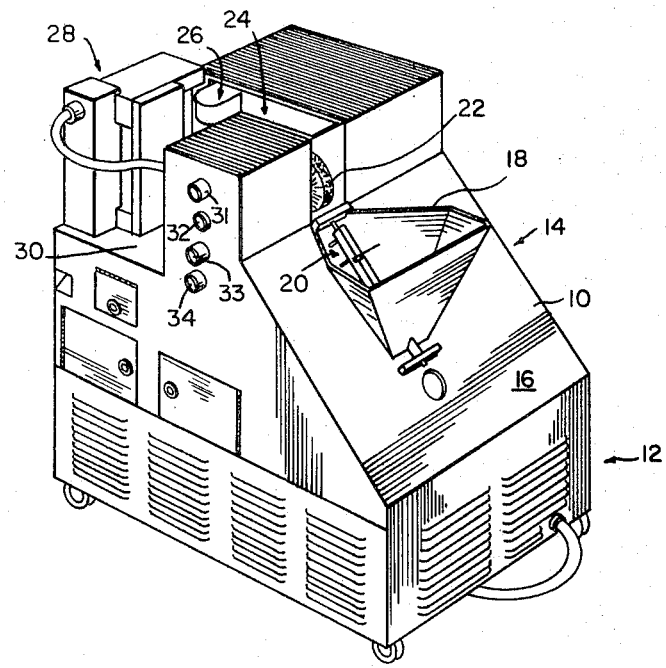
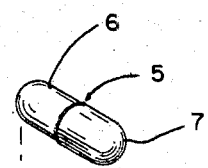
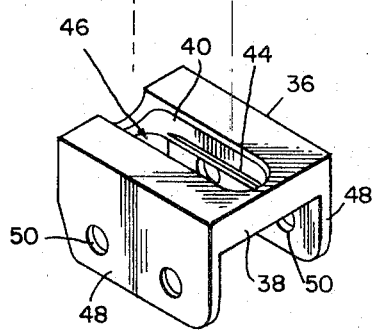
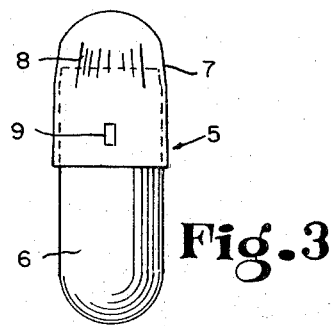
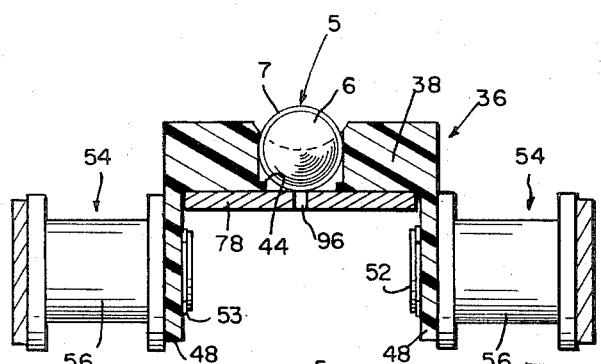
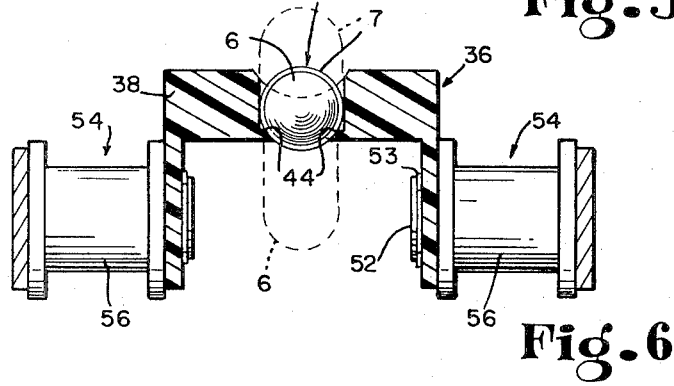

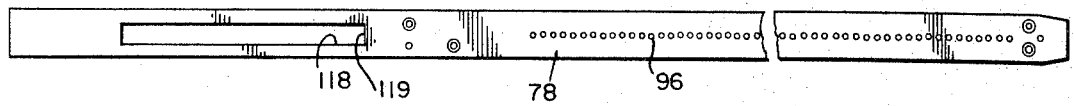
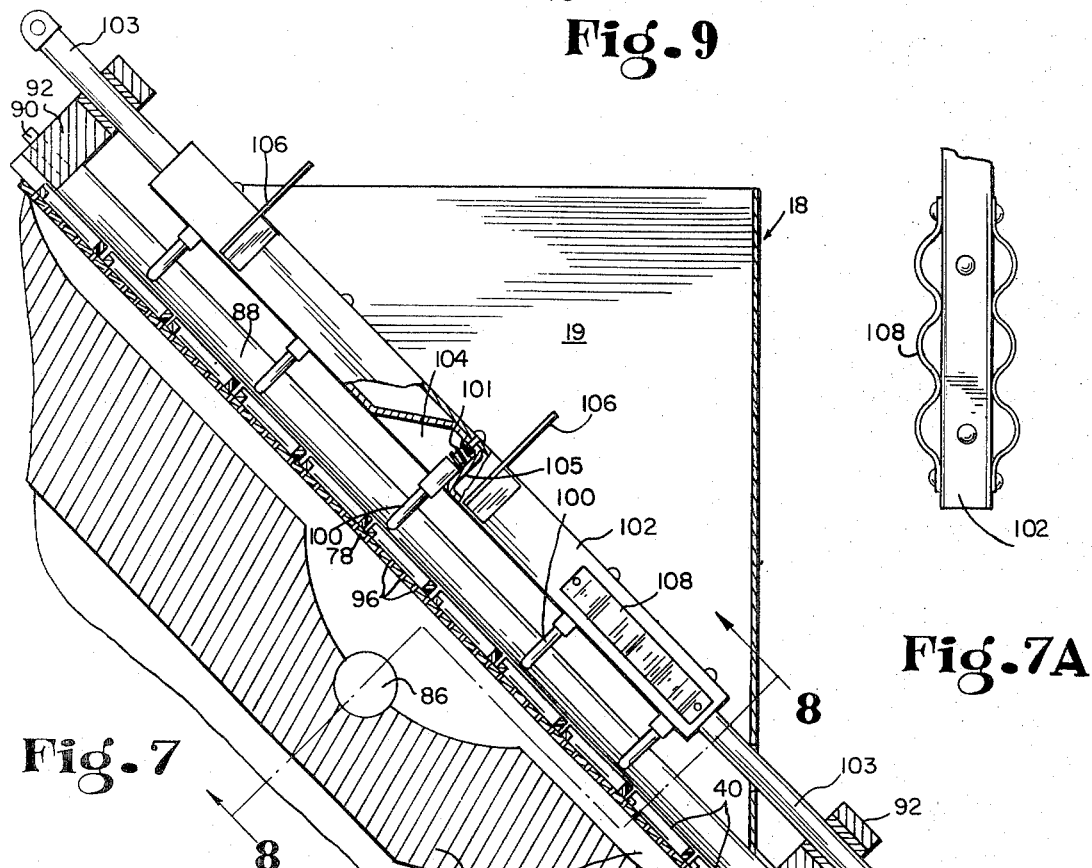
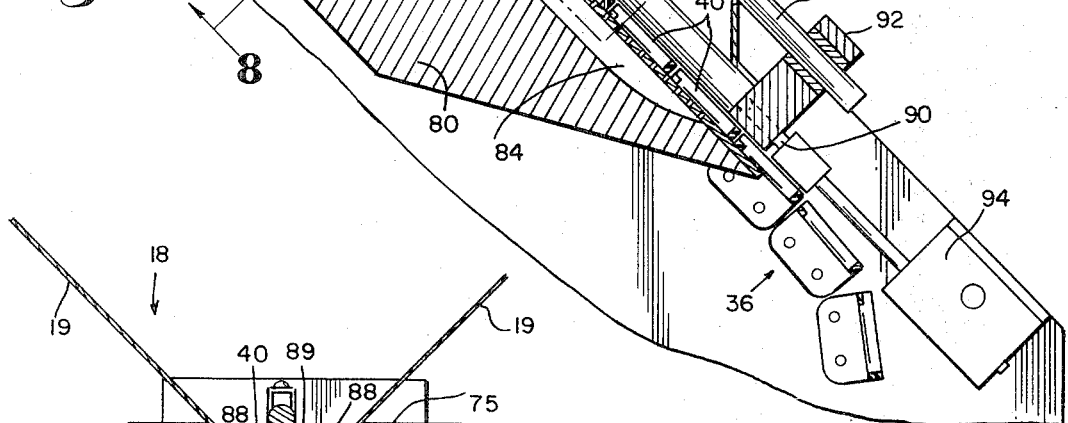
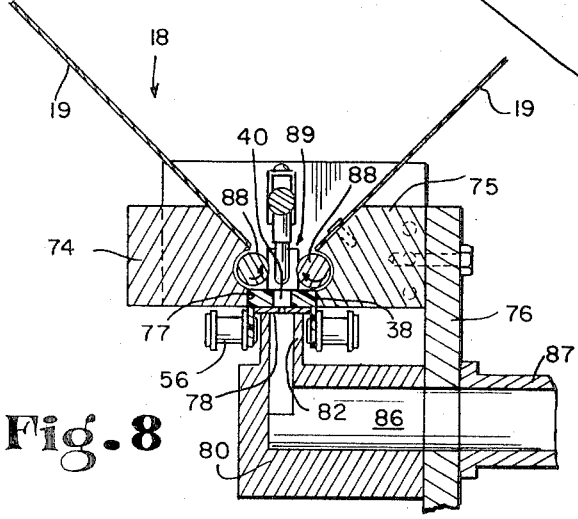

CAPSULE INSPECTION APPARATUS AND METHOD

This is a division, of application Ser. No. 105,262, filed Jan. 11, 1971.

BACKGROUND OF THE INVENTION

This invention relates to apparatus and method for inspecting medicinal capsules, and especially for handling large numbers of capsules at high rates to position them in succession in uniform orientation, at a predetermined inspection position at which each capsule is spun on its axis to expose its entire surface for inspection by optical or other means.

Medicinal capsules are made in large numbers on complex and sensitive machines, from gelatin or other material. They consist of caps and bodies which are telescopically assembled, empty, with sufficient tightness to stay together during handling as empty capsules but sufficiently loose to permit disassembly for filling. Substantially all empty capsules are used by supplying them in bulk to filling machines, where the loosely assembled capsules are disassembled, the bodies filled with medicinal material, commonly in granular or powder form, and the capsules reassembled. The empty capsules themsleves should be as free as possible of imperfections, not only as a matter of product quality, but also to provide proper operation of the filling machines, to avoid waste and improper dosage of the medicinal material, and to avoid production of imperfect filled capsules.

The requisite capsule quality requires inspection of all empty capsules before their use or sale to others for use. Heretofore, such 100 percent inspection has been done by visual observation by inspectors as the capsules are conveyed in a single-thickness layer across an illuminated screen. Such visual inspection is incomplete in that less than the whole surface of each capsule is displayed for inspection, and the inspection is by transmitted light. Further, it is a highly exacting procedure which requires continuous close concentration by the inspectors, which can be maintained for only limited periods and must be frequently interrupted by rest periods. Such visual inspection is expensive, and not fully effective.

Automatic inspection has not previously been accomplished. The entire surface area of each capsule should be inspected, and no means has been available to handle and present capsules for such inspection at a sufficiently high rate, which preferably should be at least as high as the full output of a capsule making machine and hence at a rate of from 600 to 1,200 or more capsules per minute. The capsules are of light weight and low density, and are fragile. They cannot be handled rapidly with mechanical means which might be satisfactory for other products, and can not be moved at high speed in gravity-flow mechanisms.

The present invention provides an effective capsule inspection apparatus and method, in which large numbers of capsules are loaded at high rates in succession to an inspection head which positions each capsule in a uniform location and orientation at one or more stations, and rapidly spins the capsule on its axis to present its entire surface for optical or other inspection.

SUMMARY OF THE INVENTION

In accordance with the invention, the capsules are loaded in individual elongated cavities in a conveyor which has a series of such cavities. Each cavity has an open loading side, and at another side, preferably the bottom side, has a pair of opposed ribs which define an open rectification slot of a width to pass the body of a capsule but to retain the cap of the capsule on the edges of the ribs.

The conveyor cavities are loaded as they move through a loading station at which the cavities are open to a supply of capsules, as in a hopper, while air is flowed through the cavities to positively feed the capsules into the cavities. The rectification slots of the cavities are blocked during loading, as by a rail which may constitute a vacuum manifold which induces the air flow. Means is desirably provided to agitate and otherwise control the capsules in the hopper to prevent jamming and to remove capsules from cavities which receive more than a single capsule.

The capsules may be loaded in the cavities in random orientation, that is, with either the cap forward or the body forward. Desirably, they are then uniformly oriented as the cavities pass through a rectifier station where the improperly oriented capsules are turned end for end. Desirably, body-forward capsules are all turned to a cap-forward position. To accomplish this, the cavities move from a position in which the capsules therein are supported by a rail to a position in which the rectification slots are open to a vacuum chamber. As the capsules are carried between these two positions, air flow to the vacuum chamber positively urges each body-forward capsule to turn to an upstanding position in which the capsule body projects through the rectification slot and the capsule cap is supported on the side ribs which define that slot. From such upstanding position, the capsule is then caused to tilt forward, and is then cammed or otherwise moved forward and further tilted in the cavity, to an elongated position of proper, i.e., cap-forward, orientation in its cavity.

The cavities then pass to a transfer station, at which the capsules in the cavities are picked up by pick-up fingers having end seats to which the capsules are held by vacuum. The capsules are delivered by the pick-up fingers to the loading station of an inspection head.

The inspection head comprising a circumferential series of closely spaced parallel rolls, each pair of which forms a capsule-supporting groove, and the grooves are connected to air passages. The capsules are transferred from the pick-up fingers to such grooves by cutting off the vacuum at the pick-up finger seats and applying vacuum to the head passages to produce air flow for drawing the capsules into, and retaining them in, the grooves formed by the rolls.

The inspection head is indexed to successive stationary positions to carry the capsules in the roll-formed grooves from the loading station to successive other stations, including an inspection station, a "reject" station, and an "accept" station. The rolls are rotated, conveniently by a continuous drive in the same direction about the head axis as the indexing movement, to rotate the capsules in the roll-formed grooves, and such capsules are retained in and discharged from such grooves by controlling the air flow, in or out, through the air passages during the indexing and at the respective stations.

The capsule-supporting rolls are specially shaped to position the capsules at a predetermined endwise position. For this purpose, each roll desirably has a shoulder intermediate its length to be engaged by the end edge of the capsule cap, and has a frusto-conical surface beyond such shoulder to engage an end portion of the cap.

The capsules are thus successively carried to a predetermined inspection position at the inspection station, where they are supported by air flow in a groove between two rotating rolls and each capsule is rotated on its axis to present its entire surface for inspection. Full inspection can be, and desirably is made at this position, as by an optical inspection system. However, partial or supplementary inspection stops can be carried out at other stations; for example, unbalanced capsules may be thrown off the rolls at a station ahead of the inspection station. Capsules found defective on inspection are discharged at the subsequent reject station, while acceptable capsules are retained at the reject station and discharged at a later "accept" station of the roller-formed grooves, depending on the results of the inspection.

In a preferred apparatus, the conveyor comprises a series of substantially adjoining buckets on a chain, mounted to travel upward along an incline through a hopper. The capsule-receiving cavities in the buckets are upward open and have side ridges at their bottom edges which define the rectification slot to pass capsule bodies but retain capsule caps. The hopper has a bottom feed slot over the line of cavities, preferably defined by a pair of outwardly rotating friction rolls which tend to move capsules away from the feed slot formed between them. The buckets are supported below such feed slot on a rail containing holes leading to a vacuum manifold which draws air through the feed slot and the capsule-receiving cavities to positively urge capsules from the hopper through the feed slot into the cavities. A series of spring fingers desirably projects into the slot from above and are reciprocated longitudinally of the slot to assist the feed operation and to dislodge extra capsules, as when two capsules are received side-by-side, on end in a single cavity.

The preferred bucket conveyor, after passing through the feed slot below the hopper, then traverses a rectifying station, and travels over an upper sprocket assembly which forms the transfer mechanism. The pick-up fingers are advanced radially of such wheel through the open bottom slots of the buckets to lift the capsules out of the buckets and carry them to a transfer position opposite the inspection head, which is desirably mounted vertically beside the transfer wheel.

The upward inclination of the conveyor permits it to leave the hopper at the top rather than through a side, and exposes a large number of cavities for loading in the hopper. It also permits the hopper to be located at a low height to receive the discharge from a capsule making machine, and disposes the inspection head at a higher elevation, which permits the inspected capsules to be discharged by gravity to suitable drums or other containers.

Various modifications from the preferred apparatus may be used within the broad scope of the invention. For example, size and proportions may be changed to suit different sizes of capsules; the capsules may be presented for inspection in cap-upward rather than cap-downward position; the inspection head may be horizontal or at an angle instead of vertical, the conveyor may be in the form of a disk or wheel instead of a chain; and the rectification slots of the cavities may be at a lateral side instead of the bottom side of the conveyor cavities.

BRIEF DESCRIPTION OF THE DRAWINGS

The accompanying drawings illustrate the invention and, by way of example, show a preferred embodiment of the invention. In such drawings:

FIG. 1 is a perspective view of the preferred embodiment;

FIG. 3 is a side elevation of one type of capsule to be inspected in the machine of FIG. 1;

FIG. 4 is an isometric view of a conveyor bucket;

FIG. 5 is a cross section through a conveyor bucket, showing its connection to roller chain links at its opposite sides, and showing a capsule in the bucket supported by a rail face plate as is the case at the loading station;

FIG. 6 is a view similar to FIG. 5 with the rail face plate removed and showing the tilting action of the capsule in the bucket such as occurs at the rectifying station.

FIG. 7 is an enlarged longitudinal section showing the hopper and loading mechanism;

FIG. 7A is an elevation of the lower end of the agitator bar in FIG. 7;

FIG. 8 is a transverse section taken on the line 8-8 of FIG. 7;

FIG. 9 is a plan view of the plate on which the conveyor buckets ride in the loading and rectifying stations;

DESCRIPTION OF THE PREFERRED EMBODIMENT

Figure 2:
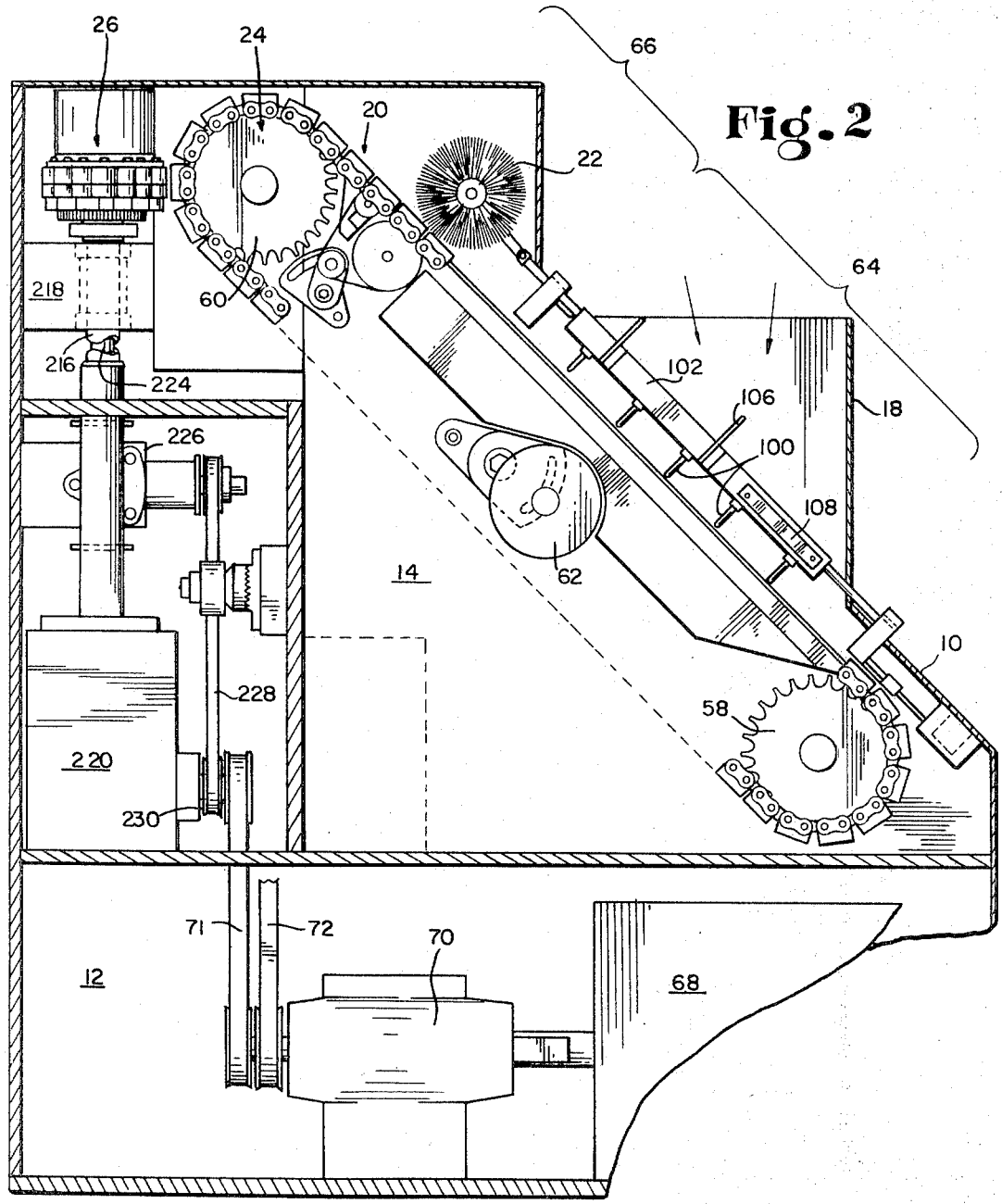
FIG. 2 is a vertical section through the machine of FIG. 1.

The capsule sorting machine shown in the drawings is for inspection of conventional medicinal capsules 5 (FIG. 3) consisting of a body part 6 and cap 7, each having a generally cylindrical side wall and a rounded end. The cap may be of the type shown in Hostetler et al. U.S. Pat. No. 3,173,840, which as shown in FIG. 3 has three wide indentations 8 near its closed end to interlock with the body when the capsule is finally assembled after filling. In addition, or alternatively, the cap may have two or more side indentations 9 to aid in retaining the capsule assembled in empty state.

Capsules are made in a number of sizes, and with some differences in proportions, as between cap and body, and with consequent different positions of the capsule center of gravity. The machine here shown has been developed particularly for size "0" capsules, but its principles will apply to machines for handling other sizes of capsules, and suitable changes in size and proportions of the machine parts may be made to accommodate different sizes of capsules.

The machine shown in FIG. 1 comprises a housing 10 enclosing a lower drive compartment 12 and an upper compartment 14 containing the driven inspection mechanism. The housing has a sloping rear wall 16 which lies below a feed hopper 18 for a conveyor 20. The conveyor runs upward on an incline at the bottom of the hopper 18, beneath a brush 22 forming part of the rectifying mechanism, and thence to a transfer wheel 24 (FIG. 2) from which capsules are transferred to an inspection head 26. An optical inspection module 28 is mounted opposite the inspection head 26 on a platform 30. Control buttons are mounted at the side of the housing 10, including a clutch and brake RUN button 31 and STOP button 32, and a motor START button 33 and STOP button 34.

The conveyor 20 is composed of a series of buckets 36 as shown in FIG. 4. Each bucket has a body portion 38 in the form of a rectangular flat plate. This contains a central longitudinal cavity 40 with parallel side walls and rounded ends, of a size to receive a single medicinal capsule 42. At the lower edge of each side wall of the cavity 40 there is a longitudinal rib 44, and the two ribs are spaced to define a downwardly open rectification slot 46. The slot width is such that the body 6 of a capsule will pass between the ribs and through the slot as shown in dotted lines in FIG. 6, whereas the cap 7 will be retained by the ribs and will not pass through the slot.

The buckets 36 are interconnected in series. Each bucket has depending side skirts 48 formed with chain pin holes 50. As shown in FIGS. 5 and 6, the skirts 48 receive the pins 52 of the pin links of two roller chains 54 disposed at opposite sides of the bucket 36, and form the inner side plates of such pin links. The pin links are interconnected by roller links 56 in the conventional manner. The pins 52 are retained in the skirts 48 by snap rings 53. The buckets are in substantially abutting relation, end to end, to form a closed series of buckets 36. The cavities are disposed longitudinally to move in single file, and to carry capsules with their axes aligned in the direction of conveyor movement.

Figure 12:
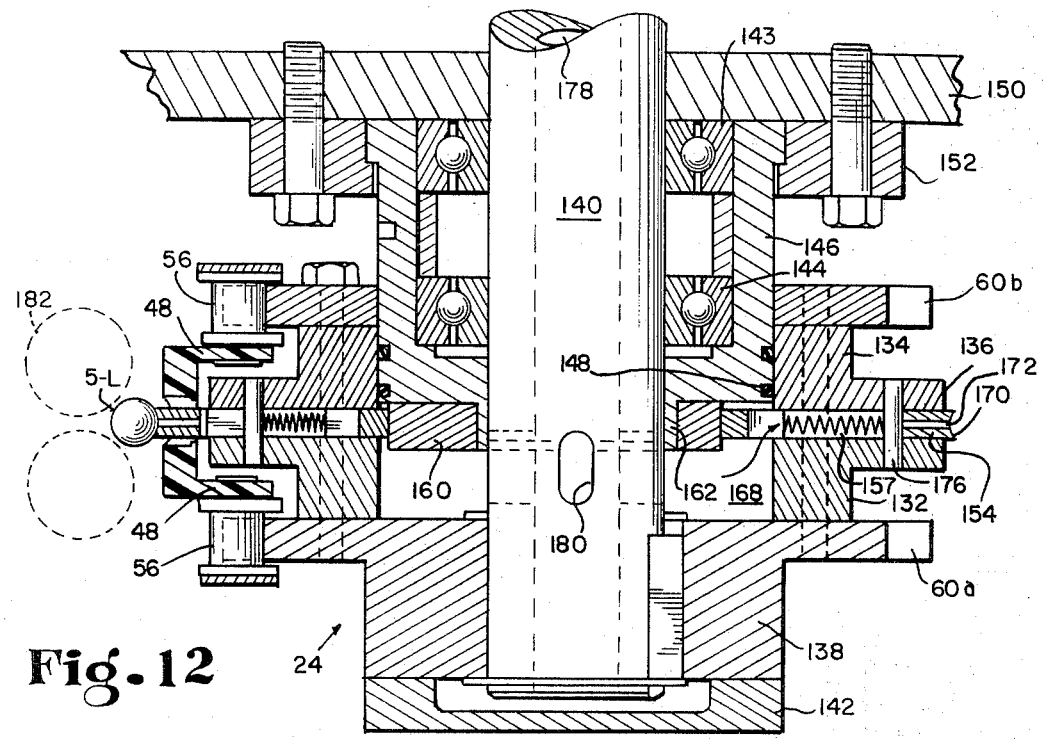
FIG. 12 is a horizontal section through the transfer wheel, taken on the line 12—12 of FIG. 11.

As shown in FIG. 2, the conveyor 20 is trained about a pair of lower idler sprockets 58 and a pair of upper driven sprockets 60 which form part of the transfer head 24 shown in FIG. 12. The conveyor has an upper operating stretch which moves upward at an inclination from the idler sprockets 58 to the driven sprockets 60, and has a parallel return stretch engaged by an adjustable tightening roller 62. The inclination permits the conveyor to leave the hopper above the normal level of capsules therein, and permits the hopper to be positioned at a low height. The inclination may vary say from 30° to 60° and the 45° inclination shown is preferred.

The upper stretch of the conveyor 20 runs first through a loading zone 64 beneath the hopper 18, then through a rectifying zone 66, and then to the transfer wheel 24, which transfers the capsules to the inspection head 26.

The conveyor and transfer wheel are driven from a motor 68 in the compartment 12, through a clutch and brake unit 70. This has two output pulleys to drive one belt 71 for the inspection mechanism described below, and a second belt 72 which is connected to drive the transfer wheel 24 and its sprockets 60 in timed relation with the inspection head 26, by means not shown.

LOADING

The conveyor loading mechanism is shown in FIGS. 7–9. The side walls 19 of the hopper 18 are mounted on long blocks 74 and 75 carried by a mounting plate 76 fixed to the frame of the machine. The inner bottom edges of the blocks 74 and 75 are grooved to form a passage 77 for the body portions 38 of the conveyor buckets 36, The buckets are supported from below and ride on the face plate 78 of a rail 82 formed as part of a vacuum manifold 80 and disposed between the chains 56. The manifold rail 82 is slotted centrally over its entire length within the hopper 18 to form a suction passage 84, which at the center is connected to an outlet passage 86 by which the manifold is connected to a source of vacuum through a pipe 87.

Immediately above the conveyor passage 77 in the blocks 74 and 75, such blocks are shaped to form part-cylindrical grooves for the reception of a pair of rollers 88. Such rollers lie in substantially tangent relation with the inner face of the hopper side walls 19, and are spaced apart to define between them a feed slot 89 leading to the cavities 40 in the conveyor buckets 36. The rollers 88 are carried by shafts 90 mounted in bearing blocks 92 at their opposite ends and driven by an angle drive mechanism 94 and other means not shown from the drive belt 72. As shown by the arrows in FIG. 8, the two rollers 88 rotate oppositely, in directions such that their faces defining the feed slot move upward and outward to urge misaligned capsules away from such slot. The surfaces of the rollers are desirably frcitional surfaces, such as are provided by rubber or other facings or surface finish on the rollers.

To induce air flow downward through the feed slot 89, the face plate 78 of the manifold rail 82 has a line of central holes 96 along its length beneath the feed slot, which communicate with the bottoms of the conveyor cavities 40 and lead to the vacuum slot 84. The face plate lies against the bottoms of such cavities 40 in the manner shown in FIG. 5, desirably in a position to support the capsules 5 therein upward away from the ribs 44 at the lower edges of such cavities so that the capsules ride on the face plate, loosely between the side walls of the cavities, to allow some air flow past the capsules through the cavities.

A series of spring-mounted fingers 100 are mounted on an agitating bar 102 in position to project downward into the fedd slot between the rollers 88 and into close-clearance relation with the conveyor buckets 36. Each finger is mounted by means of a spring 101 to the upper wall of a pocket 104 in the underside of the bar. Each pocket has a wall 105 in position to support the finger 100 against downward swinging movement, and the pocket is otherwise shaped to permit the finger to flex freely upward away from such wall 105. The agitating bar 102 also carries one or more agitating plates 106 in upper portions of the hopper 18 and carries agitating side ribs 108 near its lower end in the hopper 18. The agitating bar 102 is mounted for reciprocation by end shafts 103 slidable in the same bearing blocks 92 which support the roll shafts 90. The upper end shaft 103 is reciprocated by a Pitman arm 110 from an eccentric 112 on the shaft 114 of the rectifier brush shown in FIG. 10.

In operation of the loading mechanism, vacuum is continuously applied to the suction manifold 80 to induce a flow of air from the hopper 18 downward through the feed slot 89 between the rollers 88, through the pockets 40 of the conveyor buckets travelling beneath such slot, and into the apertures 96 in the rail face plate 78. The rollers 88 are rotated in the direction indicated by the arrows, so that they tend to move away from the feed slot 89 any capsules which are misaligned with the feed slot. The agitator bar 102 is reciprocated. Capsules are supplied to the hopper 18. It is contemplated that the hopper will be supplied from a capsule-making machine on a substantially continuous basis so that the hopper need not contain a large volume of capsules. The capsules in the hopper are continuously agitated and stirred by the atitator bar 102, and are urged by gravity and by the induced air flow to travel downward into the feed slot 89. If they are misaligned as they approach such feed slot, they will be urged back upward by the rolls 88. Capsules which are properly aligned with the feed slot will pass through between the counter-rotating rollers 88, through the feed slot, to fill the cavities 40 in the conveyor buckets travelling below and through the hopper 18. The capsules in the feed slot 89 will be agitated by the spring fingers 100, which by reason of their yieldable mounting, will apply little force tending to urge the capsules downward in the hopper but will more positively urge the capsules upward along the feed slot 89, to induce an upward circulation or movement of the capsules along the feed slot in the same direction as the direction of travel of the conveyor cavities 40. Once such a cavity 40 receives a capsule in proper position, lengthwise of the cavity 40, loading of that cavity will be completed, the loaded capsule will be retained by the air flow or suction through the apertures 96 and will be carried upward and out of the hopper 18. In the event two capsules in side-by-side upstanding relationship enter the same cavity 40, the spring fingers 100 will dislodge at least one of such capsules to permit the cavity to be filled properly with a single capsule in lengthwise position. As the conveyor travels through the loading zone, a considerable number of cavities 40 will simultaneously be open to the feed slot for loading. As shown there are at least ten cavities exposed for loading simultaneously. It is found that the degree of fill increases as the level of capsules in the hopper rises, so that operation tends to produce an equalibrium level depending on the rate of supply to the hopper, and this permits the supply rate to vary without adverse effect.

RECTIFYING

Figures 10, 10A:
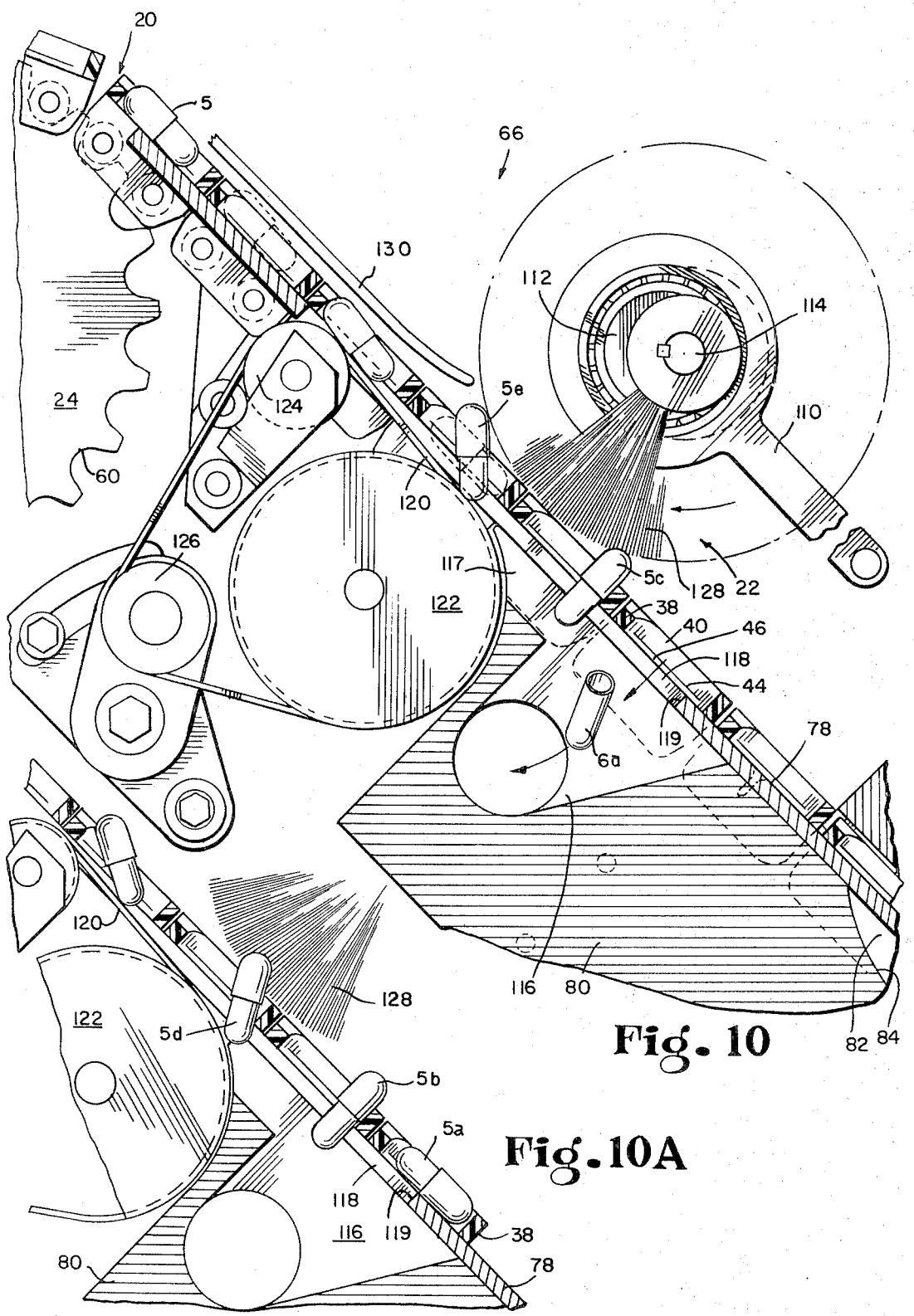
FIG. 10 and 10A are longitudinal sections showing the rectifying mechanism, with the conveyor in two different positions of its travel.

The mechanism of the rectifying station 66 is shown in FIGS. 10 and 10A. The rail 82 of the vacuum manifold 80 at the loading mechanism extends upward and forms part of the rectifying mechanism. The loading vacuum chamber 84 terminates ahead of the rectifying mechanism, and the rail face plate 78 is continued to and through the rectifying zone to a point adjacent the transfer wheel 24. At the rectifying zone, the vacuum manifold 80 is provided with a rectifying vacuum chamber 116, above which the face plate 78 is cut out to form a central slot 118 which extends longitudinally through the rectifying zone. The lower end of the slot is defined by an abrupt edge 119. The vacuum manifold 80 terminates midway of the slot 118, and its end wall is cut to form a central slot 117 to provide clearance for capsules which may project downward from the conveyor buckets at this point.

Immediately beyond the end of the vacuum manifold 80, a camming belt 120 is mounted on a driven wheel 122 and a pair of idler wheels 124 and 126, in a position to provide a belt stretch which travels on a path for convergence with the bottom face of the bucket bodies 38 travelling through the rectifying zone. The camming belt 120 is driven faster than the conveyor 20, for reasons which will appear.

A rectifying brush 22 is mounted above the conveyor at a point to engage the upright capsules in the conveyor immediately ahead of the camming belt 120. The brush is carried on the shaft 114, and is driven clockwise as shown by the arrow in FIG. 10, to provide a surface speed faster than the speed of the conveyor 20.

The purpose of the rectifying mechanism is to turn end for end those capsules which have a body-forward position, such as the capsule 5a in FIG. 10A. As a body-forward capsule reaches the position of the capsule 5a, it will be resting on the rail face plate 78, out of contact with the ribs 44 of its cavity, and loosely confined by the side walls of the cavity. Its forward end will project across and beyond the abrupt rear edge 119 of the slot 118 in the face plate, and will extend unsupported over the open slot 118. The forward end of the cavity 40 and its rectification slot 46 will then be open to the rectifying vacuum chamber 116, and air will be drawn past the unsupported forward body end of the capsule 5a to exert a positive force to tip the capsule about the abrupt edge 119. That forward body portion will tip downward between the ribs 44 while the rearward cap of the capsule 5a is supported by the edge 119 and by the ribs 44 of the conveyor cavity. In consequence, the capsule 5a will be turned to an upstanding position as shown by the capsule 5b FIG. 10A, and the upstanding capsule will tend to take a position at the rearward end of its cavity 40.

As the conveyor progresses, the upstanding capsule will be carried to the position of the capsule 5c in FIG. 10, where its upstanding cap end will be engaged by the rectifying brush 22 travelling with a forward surface speed greater than that of the conveyor 20. The brush will tilt the capsule forward as to the position of the capsule 5d in FIG. 10A. The forward-tilted capsule will then move to the position of the capsule 5e, where its lower end will be engaged by the upward converging stretch of the camming belt 120 traveling at a faster surface speed than the conveyor. This will lift the tilted capsule and urge it forward in its cavity, and move it to a position in which it lies flat in its cavity in a cap-forward position. The combined action of the lift belt 120 and the rectifying brush 22 will thus move the capsule to a cap-forward position in the cavity 40, without danger of crushing beneath the rear edge of the conveyor bucket.

The width of the lift belt 120 and its sheaves and their mounting is such that throughout this rectifying operation, the space beneath the conveyor cavities 40 will be subjected to the suction in the rectifying suction chamber 116. The suction and the resulting air flow will tend to keep the capsules 5 in place in their bucket cavities 40. A cover plate 130 may be mounted over the conveyor immediately beyond the rectifying brush 128 to close the top of the cavities and retain the capsules in them.

Any capsules in the conveyor buckets which are already in a proper cap-forward position as the bucket travels through the rectifying station will not be turned end for end. As such a cap-forward capsule reaches the position of the capsule 5a in FIG. 10A its forward cap will be retained by the side ribs 44 of its conveyor cavity, and the capsule will not tip to an upstanding position. As the trailing body-end of the capsule passes the abrupt edge 119 of the slot 118, suction and air flow may tilt such trailing end downward, but this will occur to only a limited extent and in any event the tilted capsule will be rectified by the action of the rectifying brush 22 and camming belt 120 in the same manner as described above.

In the event a conveyor bucket contains only a capsule body, without a cap, such as the body 6a shown in FIG. 10, such body will be drawn through the slot 46 at the bottom of the cavity 40 into the rectifying suction chamber 116, as will other scrap or deformed capsules or fragments which have a size and shape to pass through that slot 46. All such scrap capsule material is collected in a box 270 shown diagrammatically in FIG. 16.

When the conveyor buckets leave the rectifying station shown in FIGS. 10 and 10A, all capsules in their cavities 40 will be oriented in a cap-forward position for delivery to the transfer wheel 24. It is not necessary that all bucket cavities be filled with capsules; indeed, the conveyor and inspection mechanism is desirably operated at a speed to handle capsules at a rate somewhat in excess of the rate of supply to the hopper 18.

The rectifying system is an open system which does not depend on flow of capsules through closes passages. The mechanism is self cleaning, and skagg or scrap material is removed and collected.

The rectifying action in the embodiment shown is assisted by gravity when the capsules are such that their center of gravity is below the end of the cap 7, for such capsules will tend by gravity to take a vertical position in their cavities like that of the capsule 5d in FIG. 10A. But the rectification is not primarily dependent on gravity, but is positively actuated by air flow, by the tilting action of the brush 128 and by the camming action of the belt 120. The rectifying operation is a continuous and positively actuated operation, which gives reliable results at high rates, without damaging the capsules. Also, the mechanism need not be in a vertical plane, and is adapted to operate in a horizontal or other position.

TRANSFER MECHANISM

Figure 11:
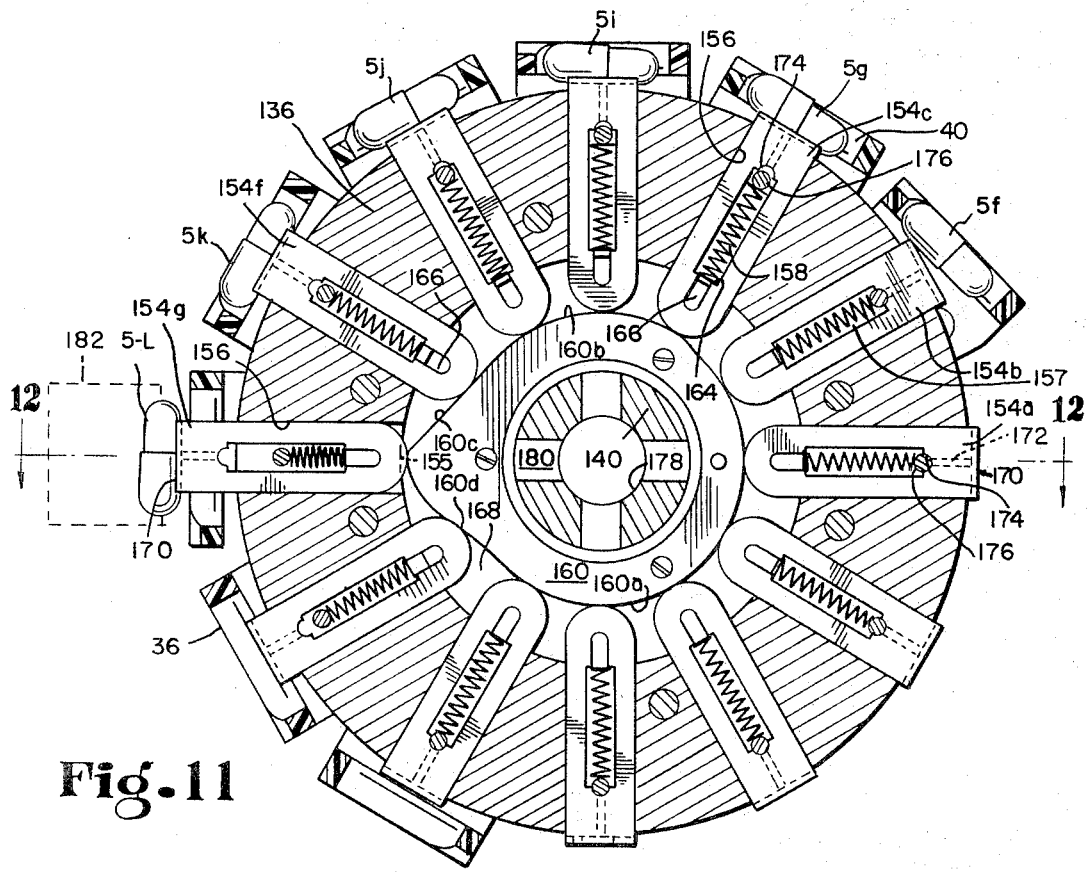
FIG. 11 is a vertical section through the transfer wheel or head.

The transfer head shown in FIGS. 2, 11, and 12, comprises a wheel assembly including the two sprockets 60a and 60b over which the chains 56 of the conveyor are trained. Such sprockets are assembled against the opposite sides of a pair of ring members 132 and 134 which lie in face-to-face relation and have circumferential flanges which together form a central circumferential rim 136 that extends between the skirts 48 of the buckets 36 of the conveyor. The two sprockets 60a and 60b and the rings 132 and 134 are bolted together to form a unitary rotor. The rotor has a hub 138 formed integrally with the sprocket 60a, mounted on and driven by a hollow shaft 140. An end cap 142 on the hub 138 seals the end of the shaft. The shaft is rotatably mounted in bearings 143 and 144 mounted within a hollow fixed hub 146 which has a sliding fit within the ring 134 and is sealed thereto by a pair of O-rings 148. The fixed hub 146 is mounted against a mounting plate 150 by a clamping ring 152 which permits it to be adjustably rotated.

The transfer head carries a circumferential series of pick-up fingers 154, each formed as a radial plunger mounted in a slide 156 formed between the two rings 132 and 134 and disposed centrally of the rim 136. The plungers 154 are spring pressed inward by compression springs 158 and have rounded inner ends which bear against a control cam 160 mounted on a reduced end portion 162 of the fixed hollow hub 146.

Each pick-up finger or plunger 154 is formed with a shaped elongated central slot 157 which at its inner end has shoulders 164 to engage the inner end of the spring 158, and a slide-valve passage 166 extending inward from the shoulders 164 in position to move into and out of the slide 156 in which the plunger is mounted and hence into and out of communication with a central vacuum chamber 168 formed within the transfer head 24. The outer end of each plunger 154 forms a tangentially disposed capsule seat 170 of concave cross-section, which is connected by a central air passage 172 to the central slot 157 in the plunger. At the inner end of such passage 172, the plunger is formed with a transverse semi-cylindrical seat 174 adapted to fit against a cross pin 176 fixed in the flanges of the rings 132 and 134. The cross pin 176 and seat 174 form a valve for controlling communication between the inner opening 157 of the plunger and the air passage 172 leading to the capsule seat 170. The transverse seat 174 is located, lengthwise of the plunger 154, in a position to be carried beyond the periphery of the rim 136 so that in cooperation with the plunger slide it forms a slide valve for venting the central slot 158 to the atmosphere to release the vacuum therein.

The hollow shaft 140 which drives the transfer head 24 has an inner passage 178 which communicates through ports 180 with the vacuum chamber 168 within the transfer head 24. The shaft 140 is driven by a power train from the drive belt 72 (FIG. 2) in timed relation with the inspection head 26, for purposes which will be more fully described in connection with that inspection head. As the transfer wheel 24 rotates, the pick-up fingers or plungers 154 move radially of the transfer head under control of the cam 160. Their angular position with respect to the teeth of the sprockets 60a and 60b is such that the plungers are aligned with the cavities 40 in the conveyor buckets 36 and the plungers move outward through such cavities 40.

Figure 16:
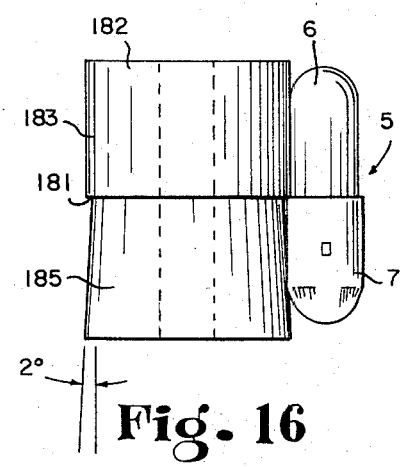
FIG. 16 is an enlarged side elevation of a preferred form of inspection head roll.

The operation of the pick-up fingers or plungers 154 on the transfer wheel 24 is illustrated in FIG. 11. The shaft 140 is driven in timed sequence with the inspection head, and its suction passage 178 is connected to a source of vacuum as indicated in the diagram of FIG. 16, to apply vacuum to the suction chamber 168 within the transfer wheel 24. The plungers 154 are pressed inward by their springs 158 against the peripheral surface of the cam 160 and are actuated in the counter-clockwise sequence shown in FIG. 11. The plunger 154a to the right in FIG. 11 is opposite a low-level land 160a of the cam 160 and is in fully retracted position.

Its seat 174 is seated against the cross pin 176, which closes the inner end of the air passage 172 and cuts off communication between the capsule seat 170 and the vacuum chamber 168. The plunger 154b is in the same retracted position as 154a. Immediately beyond the position of the plunger 154b, the cam 160 has a short rise which leads to a land 160b. The plunger 154c resting on such land is moved radially outward sufficient to separate the valve seat 174 from the cross pin 176 and to carry the capsule seat 170 at the end of the plunger into engagement with the capsule 5g in the conveyor cavity 40 aligned with that plunger 154c. This lifts the capsule slightly upward in that cavity 40 aligned with the plunger 154c to support it above the ribs 44 at the sides of the cavity. The capsule 5g is held on the pick-up finger seat 170 at the end of the plunger 154c by suction acting through the air passage 172, the plunger slot 157, and the valve passage 166, which in this position is open to the vacuum chamber 168.

The capsule is carried in raised position within the conveyor cavity 40 through the positions of the capsules 5i and 5j in FIG. 11. The inner end of the plunger then engages a rise 160c of the cam 160, and the plunger is progressively advanced, through the position of the plunger 154f. The capsule 5 is continuously held on the capsule seat 170 of its plunger 154 through movement of the plunger through the positions 154g to 154f, since the valve passage 166 remains in communication with the vacuum chamber 168 to apply suction to the capsule seat at all such positions. As the plunger advances from the position of the plunger 154f to that of the plunger 154g, directly to the left in FIG. 11, the plunger is projected to its outermost position. The movement carries the inner valve passage 166 wholly into the plunger slide 156, past the inner edge 155 of that slide, and this shuts off communication between the vacuum chamber 168 and the central slot in the plunger 154g, which in turn cuts off the application of suction to the seat 170 of the plunger 154g. Shortly thereafter, the transverse valve seat 174 passes out of the outer end of the plunger slide channel 156 and opens the central slot 157 to the atmosphere, which relieves any suction on the capsule seat 170. The capsule 5-L is then released for transfer to the loading station of the inspection head 26, the rolls 182 of which are shown in dotted lines in FIGS. 11 and 12.

In further counterclockwise movement, the plungers 154 are retracted from the projected position of the plunger 154g on the nose of the cam 160. The further rotation of the inspection head 24 carries the plungers down a slope 160d of the cam 160 back to the low-level land 160a. This disengages the outer ends of the plungers from the buckets 36 of the conveyor and permits the conveyor to leave the inspection head to move through its lower stretch shown in FIG. 2. Plunger retraction closes the valve seat 174 against the cross pin 176 and opens the valve passage 166 to the vacuum chamber 168 in preparation for a new cycle. It is advantageous to use plungers 156 mounted radially in a transfer wheel over which the chain conveyor is trained, but pick-up fingers may also be used in other positions, for example in a wheel positioned externally of the conveyor path.

INSPECTION HEAD

The inspection head 26 shown in FIGS. 2 and 13-15 comprises a circular series of twelve capsule-spinning rolls 182 mounted about the periphery of a carrier 184 formed of a hub 186 and a ring 188. Each roll 182 is fixed on a shaft 190 which is mounted in ball bearings 192 and 193 at its opposite ends. The lower end of each shaft 190 carries a gear 194 in mesh with the upper portion of a ring-shaped spinner gear 196 mounted on a ball bearing 198 on the hub 186.

Each pair of rolls 182 forms a capsule-receiving groove 200 between them, and the rolls lie in close clearance relation at their sides and ends with shaped portions of the periphery and end flanges of the carrier 184. The close clearances substantially close the capsule receiving grooves 200 at their inner peripheries. The flanges of the ring 188 and hub 186 which lie above and below the rolls have scalloped edges so that such flanges substantially overlie and underlie the entire ends of the rolls 182 but provide open ends for the grooves 200 to permit the capsules, such as the capsule 5-L shown in FIG. 13, to enter such grooves 200 in the transfer operation and to permit loose capsules or fragments to drop out of the grooves.

The bottom of each groove 200 communicates through an air passage 202 in the ring 188 with the hollow inside of the ring. A valve block 204 is seated in such ring 188, and contains a main vacuum chamber 206, a control vacuum chamber 208, and an air passage 210. These are connected to separate vacuum and air passages in a manifold 212 which is fixed to a supporting wall 214 and holds the valve block 204 stationary within the inspection head 26.

Figure 14:
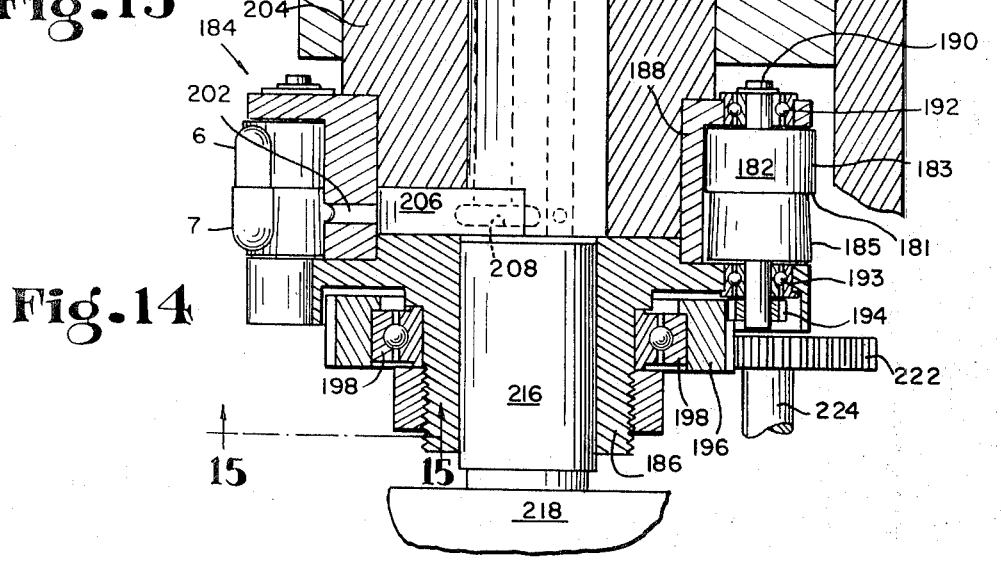
FIG. 14 is a vertical section on the line 14—14 of FIG. 13.

As shown in FIGS. 14 and 16, each capsule spinning roll 182 is desirably formed with a downward-facing shoulder 181 intermediate its length, between an upper portion 183 of relatively large diameter and a lower portion 185 of slightly smaller diameter. As appears at the left in FIG. 14, the capsules are desirably carried by the spinning rolls 182 in an inverted position, with the cap 7 at the bottom and the body 6 at the top. The different diameter sections of the rolls 182 accommodate the different diameters of the cap and body of the capsule, and the shoulder 181 provides a stop against which the edge of the cap 7 may be located to fix the vertical position of the capsule in its supported position on the inspection head. It is found that by suitably positioning the air passage 202 axially of the groove 200 with which it communicates, an air flow pattern can be established which will tend to lift the capsule 5 to position it with the edge of its cap against the shoulder 181. FIG. 14 shows the passage 202 in a preferred position, where it is below the center of the capsule and generally intermediate the length of the cap 7. This position has been found effective to lift the capsule, and it is believed that such lifting results from greater air flow against the bottom end of the capsule than against the top end of the capsule to the passage 202.

The lower portion 185 of each spinning roll 182 may desirably have a slightly conical outer surface, with its small end at the shoulder 181. The degree of taper at each side of the surface is desirably at least equal to the taper or flare of the skirt of the capsule cap which results from draft taper of the pins on which the caps are made, and may be in the range of from ½° to 4°. With capsules of the type which have locking indentations 8 and 9 as shown in FIG. 3, a roll taper of 2° has been found advantageous, and causes the rolls to make contact with the capsule cap in the area between the two sets of indentations, and hence to avoid an irregularity of support which might otherwise occur.

The inspection head is mounted on an indexing shaft 216 which, as shown in FIG. 2, is journalled in a heavy steady bearing 218 close below such inspection head. The shaft 216 extends downward to an indexing mechanism 220 driven by the belt 71 from the clutch and brake unit 70. The indexing mechanism 220 is a commercial unit containing indexing mechanism to index the inspection head 26 in predetermined indexing cycles. The mechanism used in the embodiment shown provided an indexing cycle in which 30° indexing movement was completed in one-third (⅓) of each cycle and the head 26 was held stationary during two-thirds (⅔) of each cycle. By way of example, for an inspection rate of 600 capsules per minute, the transfer wheel will rotate at 50 revolutions per minute to deliver 600 capsules per minute from the 12 plungers 154. Correspondingly, the inspection head is indexed 600 times per minute through 30° indexing movements, to present its twelve grooves 200 to the loading station at the rate of 600 per minute.

Figure 13:
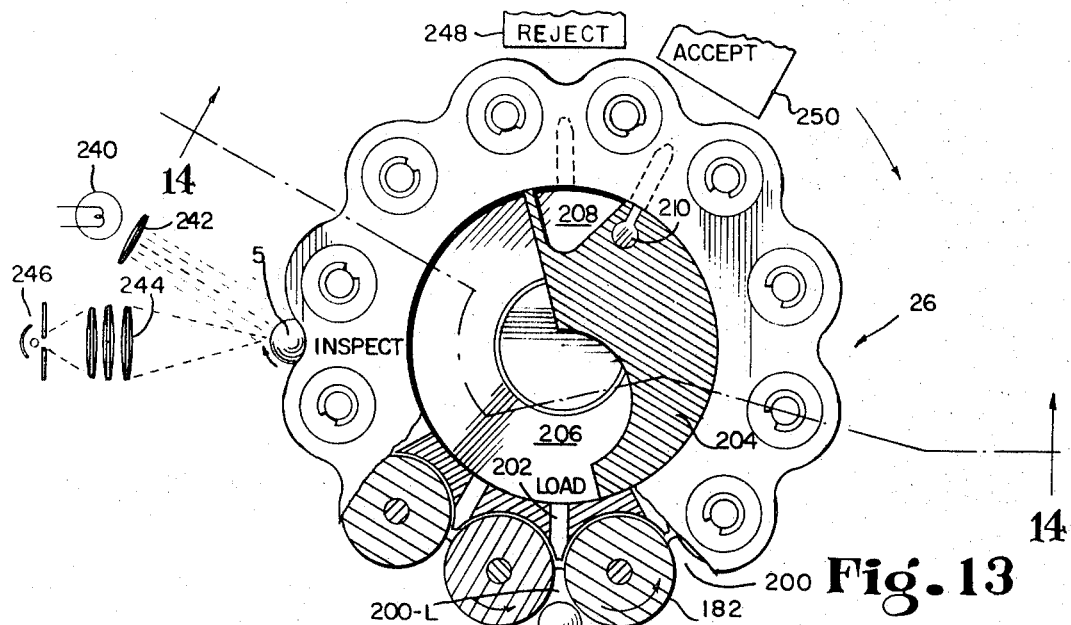
FIG. 13 is a plan view of the inspection head, with parts broken away to show the air passages.
Figure 15:
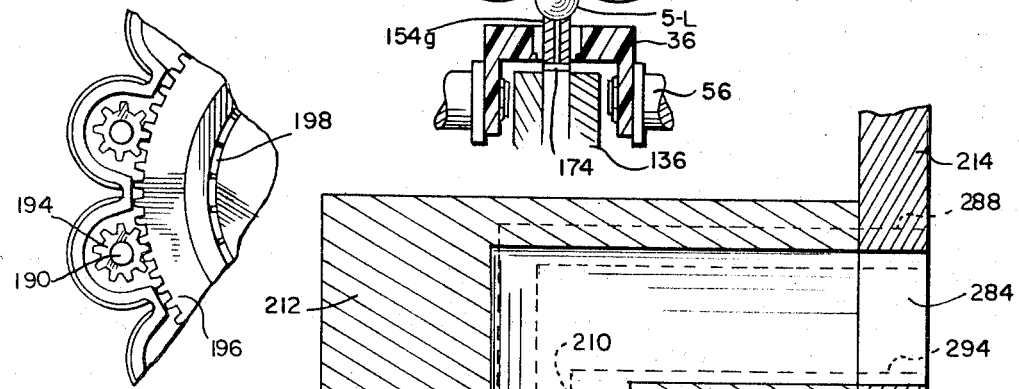
FIG. 15 is a horizontal section taken on the line 15—15 of FIG. 14.

The rolls 182 are simultaneously and continuously driven in rotation through their gears 194 which mesh with the ring gear 196. To this end, such ring gear 196 is driven by a gear 222 mounted on a shaft 224 driven from an angle drive mechanism 226 connected by a belt 228 to a pulley 230 on the input shaft of the index mechanism 220. The index movement is clockwise as shown in FIG. 13, and the roll-spinning gear 196 is also driven clockwise, in the same direction as indexing, so that it drives the rolls 182 to spin them in a counter-clockwise direction as shown by the arrows at the bottom of FIG. 13.

In each stopped position of the index head, the rolls 182 will be rotated at a full speed determined by the drive speed of such ring gear 196. During the indexing movement of the head, however, since its indexing is in the same direction of rotation as the roll-spinning gear 196, the relavtive movement between the indexing head and the roll-spinning gear 196 will be reduced, and may indeed completely stop. Spinning rotation of the rolls on their axes depends on such relative rotation of the head and gear 196, hence, the rolls will be slowed and may stop during the indexing movement but will resume spinning as the indexing movement is completed in each cycle and the rolls 182 are held in fixed position at the successive dwell stations. In the example given above, for an inspection rate of 600 capsules per minute, the rolls may have a full speed spinning rate of 2,400 R.P.M., to give the capsules a spinning rate on their axes of the order of 6,000 R.P.M. This provides about ten revolutions per indexing cycle and about six revolutions during the dwell of each cycle, which allows inspection with a good measure of redundancy.

The inspection head and its associated mechanism provide a series of stations at angularly displaced positions about its axis. These include a loading station, shown at the bottom of FIG. 13, an inspection station, shown at the left in FIG. 13, a reject station shown at the top in FIG. 13, and an accept station one index step beyond the reject station. At the loading station, the groove 200-L between the rolls 182 lies opposite the discharge position of the transfer head 24, where the capsule 5-L carried by the plunger 154g is positioned in the groove 200-L. When the vacuum holding the capsule on the plunger 154g is cut off and relieved by the valving action of the passage 166 and seat 174, the capsule will be released in the groove 200-L and air flow in the groove will seat and support the capsule against the rolls.

Air flow for loading is provided by the valve block 204 in the inspection head. At the loading station, the main vacuum chamber 206 is in communication with the air passage 202 leading to the groove 200-L. Vacuum is continuously maintained in that chamber 206 and is thus applied to each groove 200, through its passage 202, as the groove reaches the loading station. Accordingly, as the capsule 5-L is released from its seat 170 on the plunger 154g, it is drawn by air flow into the groove 200-L and against the rolls 182 defining that groove.

The main vacuum chamber 206 also maintains vacuum through the passages 202 continuously as the capsule-containing grooves index from the loading station through three subsequent index steps and at the inspection station, at the left in FIG. 13. This causes air flow to maintain the capsules in place in the grooves throughout that movement.

At the inspection station, the capsule 5 held in the groove 200 between the rolls 182 will be rapidly rotated on its axis in a fixed position, to expose its entire surface for inspection through a plurality of revolutions of the capsule. Preferably, the capsule surface is rotated through at least five rotations at the inspection station, but this can vary to suit the inspection system.

Inspection may be done optically, by means indicated diagrammatically in FIG. 13. This comprises one or more light sources 240, each with a lens 242, to illuminate the spinning surface of the capsule 5. The illuminated surface is observed through a scanning lens 244 and light reflected from the capsule surface is observed by a photosensitive unit 246. A plurality of such inspection systems may be used to inspect different areas of the capsule surface. The inspection response is processed in a suitable control mechanism to control acceptance or rejection of the inspected capsule.

From the inspection station, each capsule 5 is carried through two successive idle stations at which the groove 200 containing it is continuously connected through its air passage 202 to the main vacuum chamber 206 of the valve block 204. As the head moves to the next or reject station, the air passage 202 is carried out of communication with the main vacuum chamber 206 and is brought into communication with the control chamber 208. This is supplied with vacuum to retain the capsule if the capsule has been found acceptable at the inspection station, and is supplied with compressed air if the capsule has been found unacceptable at the inspection station. When air is supplied to such control chamber 208, it passes through the air passage 202 and ejects the capsule from the groove into a reject chute 248. If the capsule is acceptable, vacuum is applied to the control chamber 208 to retain the capsule on the inspection head at this station, and carry it to the accept station. At such accept station, the air passage 202 from the capsule groove 200 is in every case registered with the air passage 210, and this supplies air to eject the capsule from the head to an accept chute 250.

Figure 18:
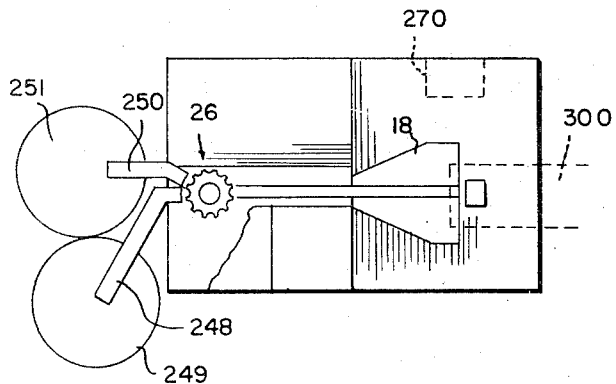
FIG. 18 is a plan view showing the reject and accept chutes and containers.

The arrangement of the accept and reject chutes are shown diagrammatically in FIG. 18. The reject chute 248 leads to a container 249 for collecting the rejected capsules. The accept chute 250 leads to a container 251 for collecting the accepted capsules. It will be understood that the inspection control mechanism can be provided with means to count the accepted and rejected capsules, and appropriate consequent action caused to occur when predetermined counts are reached. For example, when a desired quantity has been collected in the container 251, it can be removed and a new container provided; and when an above-normal run of rejected capsules occurs, a suitable warning signal may be given.

AIR SYSTEM

Figure 17:
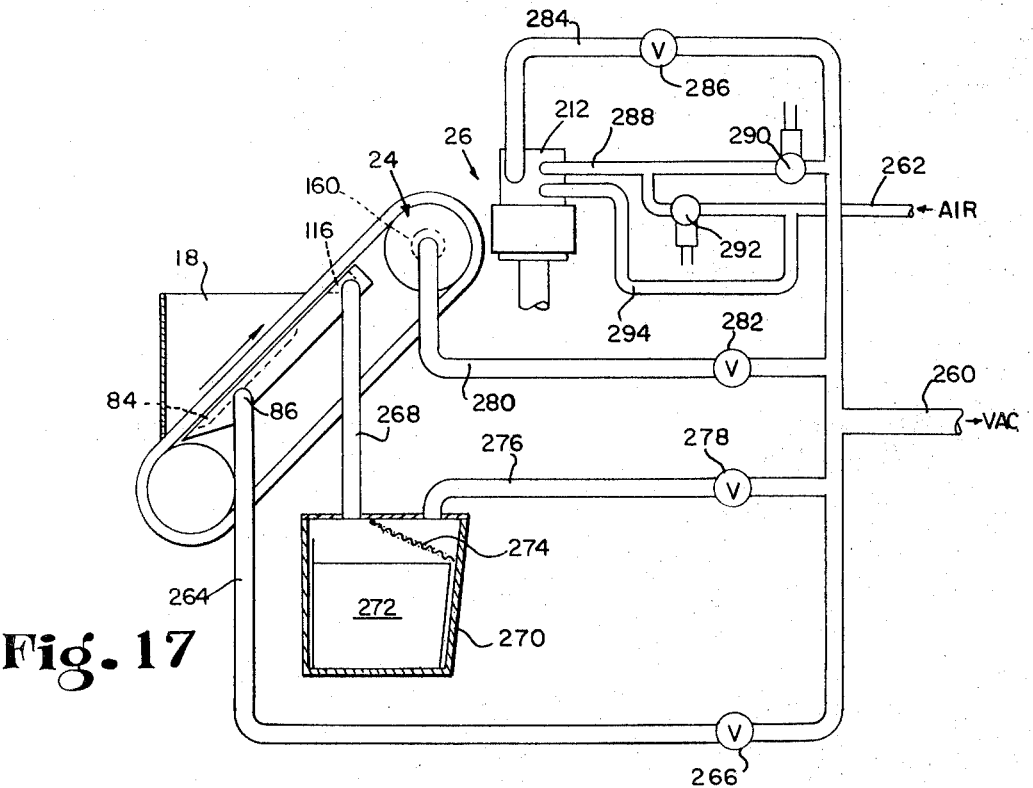
FIG. 17 is a diagram of the air and vacuum system of the machine shown.

The vacuum and air system used with the above described mechanism is shown diagrammatically in FIG. 17. The system includes a pipe 260 connected to a suitable source of vacuum and a pipe 262 connected to a suitable source of air under pressure. The vacuum chamber 84 at the loading station beneath the hopper 18 is connected through its outlet 86 to a suction pipe 264 to the vacuum source pipe 260 through a control valve 266. The rectifying vacuum chamber 116 is connected through its outlet to a suction pipe 268 leading to a scrap collection box 270 containing a removal scrap container 272. The scrap collection box 270 is connected through a screen 274 to a suction pipe 276 which is connected to the vacuum source pipe 260 through a valve 278. The transfer head 26 has its vacuum chamber 160 connected through the shaft passage 178 to a suction pipe 280 which communicates with the vacuum source pipe 260 through a valve 282.

The inspection head has its main suction chamber 206 continuously connected through a conduit 284 and a regulating valve 286 to the vacuum source pipe 260. The control chamber 208 of the valve block 204 is connected through a conduit 288 to a normally open, solenoid-operated valve 290 to the vacuum source pipe 260, and is connected through a normally closed, solenoid-operated valve 292 to the air source 262, so that vacuum is normally applied to the control chamber 208 but such vacuum is shut off and air supplied instead by reversing the positions of the solenoid-operated valves 290 and 292 in response to a suitable signal from the inspection control mechanism. The air passage 210 of the valve block 204 is connected by a passage 294 to the air pipe 262 so that it is continuously supplied with air under pressure.

OPERATION

The general operation of the capsule handling mechanism described above is as follows: Capsules are supplied to the hopper 18, as from a discharge chute 300 (FIG. 17) from a capsule-making machine, and are received in the hopper at the loading station shown in FIGS. 2, 7, and 8. The capsules in the hopper are kept agitated by the agitating bar 102, and those which are aligned with the feed slot 89 between the outward rotating rollers 88 pass through such feed slot to the conveyor. They are positively urged through the slot and into the cavities 40 of the buckets 36 of the conveyor by air flow to and through the apertures 96 in the face plate 78 of the vacuum manifold rail 82 on which the conveyor buckets ride. Misaligned capsules lying transversely of the friction rollers 88, will be propelled away from the feed slot 89 by the outward rotation of those rollers 88, or will be turned into alignment, parallel with the rollers, and will then be free to enter the feed slot. The combination of actions provided at the feed slot has been found effective to load capsules into the conveyor cavities at rates well above 600 capsules per minute.

The conveyor carries the capsules from the loading station to the rectifying stations 66 where capsules in a body-forward position are turned end for end in the manner described in the section entitled RECTIFYING set forth above. Also, the rectifying station removes from the conveyor separate bodies or capsule fragments which are small enough to pass through the slot 118 of the face plate 78. Such bodies and fragments are carried through the suction passage 268 to the collection box 270 (FIG. 17) where they are collected for periodic removal.

The capsules contained in the cavities of the conveyor as it leaves the rectifying station are all in cap-forward position, and are carried to the transfer wheel 24 shown in FIGS. 2, 11 and 12. The radial pick-up plungers 154, are mounted internally of the wheel on which the conveyor travels, and travel with the buckets, at the same speed, and continuously in registry with the bucket cavities over a considerable arc, and time, of travel. During such travel, the plungers are progressively advanced outward through the bottom rectification slots of the cavities. This causes the caps to be picked up on the seats 170 of the pick-up plungers 154, where they are held by vacuum until the plungers reach the discharge position shown at the left in FIG. 11 and at the bottom of FIG. 13. Here, the vacuum holding the capsules 5 on the plungers 154 is cut off and vented as the inner valve passage 166 moves into the plunger slide channel 156 and the outer valve seat 174 moves out of that slide 156. The capsule carried by the plunger is then released for transfer to the inspection head.

At the inspection head shown in FIGS. 2, 13–15, as the capsule 5 is released from the plunger 154, it is drawn by air flow into the groove 200 between the pair of spinning rolls 182 at the loading station during the dwell period of an indexing cycle of the inspection head. The transfer desirably takes place early in the dwell period, to allow ample time for the capsule to become stabilized in the groove. The inspection head then indexes to carry the loaded capsule away from the loading station and to present the next capsule-receiving groove for loading. Air flow induced by suction in the main suction chamber 206 is maintained as the capsule-containing groove is indexed through three index steps to the inspection station shown at the left in FIG. 13. At each step, the rolls go through a complete indexing cycle of index movement during one-third of the cycle and dwell during two-thirds of the cycle. Rotation of the capsule supporting rolls 182 slows down or stops during indexing movement and resumes during the dwells. This action tends to cause badly formed or unbalanced capsules to be thrown off the inspection head at the intermediate index stations, but well-formed capsules continue on to the inspection station.

At the inspection station, the capsule is spun on its axis in a fixed position and is vertically positioned by engagement of the edge of its cap 7 with the shoulder 181 intermediate the length of the spinning rollers 182. The air flow pattern causes greater air flow at the bottom than at the top of the capsule, which lifts the capsule to support it in inspection position. The rotation exposes the entire external surface of the capsule for inspection, and the timing is such as to continue such exposure for several revolutions to permit repetition or redundancy of inspection of the whole circumference. Inspection may be carried out by any suitable means, such as by the optical system shown diagrammatically in FIG. 13 or by a plurality of such systems. The inspection generates a control signal which is used to reject or accept the capsule at subsequent stations.

At the inspection station, the spinning rolls are desirably driven at a rate to spin the capsules at a speed of about 100 or more revolutions per second and at a time rate of 10 or less milliseconds per revolution. At an inspection rate of 600 capsules per minute, the inspection head is indexed in cycles of 100 milliseconds duration. In each cycle, beginning with the dwell, an initial period of say 10 milliseconds is allowed to permit the capsule to stabilize in its inspection position, and this period is also used for actuating the reject valve if a previously inspected capsule is to be rejected in this cycle, in order to avoid valve actuation during actual inspection. The initial 10-millisecond period is followed by an inspection time of 50 to 60 milliseconds duration during which other parts of the machine are maintained in as stable a state as possible to avoid disturbing the inspection. The remaining time of the cycle, of from 30 to 40 millseconds is used for indexing the inspection head, and for returning the reject valves to normal condition if they were actuated earlier in the cycle. This cycle provides five rotations of the capsule during inspection, which allows a good margin for repetition or redundancy in the inspection function. For higher inspection rates, proportionately higher speeds and shorter time periods may be used.

After inspection, the capsule is carried from the inspection station through three indexing steps to a reject station at the top of FIG. 13. At this point, the air passage 202 controlling air flow in the capsule receiving groove 200 is connected to the control chamber 208. If the inspection has indicated that the capsule should be rejected, the positions of the normally open vacuum valve 290 and the normally closed air valve 292 are reversed, which cuts off suction from the control chamber 208 and supplies air under pressure thereto. Such air is discharged through the passage 202 and ejects the capsule into the reject chute 248. If the capsule is acceptable, vacuum is maintained in the control chamber 208 and the capsule is retained on the inspection head 26 at the reject station, and is carried to the next station. Here, air from the air passage 210 is discharged through the passage 202 to the capsule-receiving groove 200 and ejects the remaining capsule to the accept chute 250. The rejected and accepted capsules are respectively collected in the containers 249 and 251 shown in FIG. 18.

The embodiment shown and described is the presently preferred embodiment and has been found suitable and effective to handle capsules at high rates well above 600 capsules per minute. Operation at rates up to 1,200 capsules per minute or higher is contemplated.

Various modifications and departures from the preferred embodiment shown may be made within the scope of the invention in its broader aspects. For example, the conveyor need not travel in a vertical plane, but may carry a series of cavities single file in a horizontal plane, as in a circular or other closed path; the transfer wheel in its broader apsects need not be located internally of the conveyor path but may be disposed laterally or otherwise externally of the path, and may remove the capsules either from the loading side or from some other side of the cavities; and inspection need not be confined to a single station on the indexing head but may be done at more than one station.

The present invention provides a handling system which may itself perform certain sorting functions, as to eliminate loose capsule bodies and other scagg and badly unbalanced capsules. The system is a generally open system which is self-cleaning so that it is not liable to fail from clogging or jamming. The system is primarily intended, and effective, to handle large numbers of capsules, at high rates, to present them in series to an inspection station, to spin them on a fixed axis at that station to expose their surfaces for inspection, and to sort the inspected capsules in accordance with the inspection results.

We claim:

1. Apparatus for handling medicinal capsules to present the same successively in uniform endwise orientation, comprising a conveyor forming a series of spaced capsule-receiving cavities for conveying capsules along a conveyor path, each cavity being shaped to loosely confine an individual capsule therein and being open at one side for purposes of rectification, means forming at said one side a rectifying slot defined by spaced side edges, the slot width and edge spacing being such as to pass the body of a capsule but retain the cap thereof, a rail along which the cavities move in said path, disposed at the rectifying-slot side of the cavities in position to support the capsules in loose confinement therein, away from said side edges, said rail forming a shoulder across which the loosely confined capsules are conveyed, so arranged that at an intermediate position the capsule will have one end supported on the rail adjacent the shoulder and the other end projecting unsupported beyond the shoulder, means to induce airflow through the rectifying slot against the unsupported end of a capsule in said intermediate position, whereby when the initial orientation of the capsule is such that said unsupported end is the body-end of the capsule the said body end will be positively urged to tilt about the shoulder and into the rectifying slot to tilt the capsule to a partially-rectified position wherein the said body projects into the slot and the capsule is retained by engagement of its cap with the side-edges, and means in position to act on the thus-tilted capsule for further tilting the same toward an endwise orientation opposite to its initial orientation and for moving the capsule to said opposite endwise orientation in the cavity.

2. Apparatus for handling medicinal capsules to present the same successively in uniform endwise orientation, comprising a conveyor forming a series of longitudinally spaced capsule-conveying cavities shaped to loosely confine individual capsules therein and disposed endwise in a conveyor path for conveying a series of individual capsules endwise along said path, each cavity being open at one side of the conveyor path for the purposes of rectification, means forming at said side a rectifying slot defined by spaced side edges, the slot width and edge spacing being such as to pass the body of a capsule but retain the cap thereof, a rail along which the cavities move as they enter the rectifying zone, disposed at the rectifying-slot side of the cavities in position to support the capsules therein away from the edges, said rail forming a shoulder across which the rail-supported capsules are carried, whereby at an intermediate position a loosely confined body-forward capsule will have its rearward cap end supported by the rail adjacent the shoulder and its forward body end projecting unsupported beyond the shoulder, means to induce airflow through the rectifying slot and against the unsupported end of the capsule in said intermediate position to positively urge the capsule to tilt about said shoulder to a tilted position wherein the capsule body projects into said slot but the capsule is retained by engagement of its cap with said slot side edges, and camming means acting on the body end of the tilted capsule as it is conveyed by the conveyor for camming the capsule to a cap-forward position in the cavity.

3. Apparatus as set forth in claim 2 with the addition of tilting means which comprises a rotary brush positioned to engage the cap ends of the partially tilted capsules and rotating at a surface speed greater than the conveyor speed.

4. Apparatus as set forth in claim 2 in which said rectifying slot is formed in the conveyor and defined by the edges of offsets on the side walls of the cavities, whereby the cap-supporting edges move with the conveyor.

5. Apparatus as set forth in claim 2 with the addition of tilting means beyond the shoulder along the conveyor path for further tilting the partially tilted capsule to a forward-leaning position, and wherein said camming means comprises a belt having an operative stretch disposed in position to engage the body ends of the tilted capsules and extending in converging relation with the rectifying-slot side of the conveyor, and means to drive the belt at a surface speed faster than the speed of the conveyor.

6. Apparatus as set forth in claim 4 wherein said conveyor comprises a series of buckets having body portions containing said cavities, interconnected in chain relation, said conveyor being trained about spaced wheels to form an operative stretch, said rail extending along said operative stretch in supporting engagement with the undersides of said bucket body portions, an air chamber in said rail at said shoulder and communicating with the rectifying slots of said conveyor cavities as they travel across said shoulder, and means to apply vacuum to said air chamber to induce air flow through the cavities for tilting the capsule therein.

7. Apparatus as set forth in claim 6 in which the rectifying slot is an open slot adapted to pass loose capsule bodies and other scagg, and said means to induce airflow through the rectifying slot comprises a conduit adapted to convey such scagg to remove the same from the conveyor, and scagg collection means to which said conduit is connected.

8. The method of presenting a succession of medicinal capsules in rectified orientation for inspection or other processing, which comprises, loading the capsules in random endwise orientation in loosely confining cavities in a conveyor, supporting the loosely confined capsules on an underlying support and over a rectifying slot which will pass the body but retain the cap of a capsule, conveying the thus-supported capsules individually across a shouler and inducing airflow in a direction to tilt the projecting end of the capsule about the shoulder and through the slot, thereby tilting body-forward capsules to an upstanding position, supporting the upstanding capsule by its cap diameter while further tilting the same to a leaning position, camming the leaning capsule to a reversed orientation, and delivering the rectified capsules to processing apparatus.

9. Apparatus for handling medicinal capsules to present the same successively in uniform endwise orientation, comprising a conveyor comprising a chain of buckets having capsule-receiving cavities therein for conveying capsules along a conveyor path, each cavity being shaped to loosely confine an individual capsule therein, said buckets forming at one side of each cavity a rectifying slot defined by side edges spaced so as to pass the body of a capsule but retain the cap thereof, a rail along which the buckets move in said path, disposed at the rectifying-slot side of the cavities in position to support the capsules in loose confinement therein, away from said side edges, said rail being interrupted to form a shoulder across which the loosely confined capsules are conveyed, so arranged that at an intermediate position an improperly oriented capsule in a cavity will have its cap end supported on the rail adjacent the shoulder and its body end projecting unsupported beyond the shoulder, means to induce airflow through the rectifying slot against the unsupported end of the capsule as it moves through said intermediate position, to positively urge the capsule to tilt about the shoulder to a position wherein the said body projects into said slot and the capsule is retained by engagement of its cap with said side-edges, and means to act on the tilted capsule for further tilting the same toward an endwise orientation opposite to its initial orientation and moving the capsule to said opposite endwise orientation in the cavity.

10. Apparatus as set forth in claim 9 wherein said air flow-inducing means comprises means defining an air flow passage disposed for communication with the outer ends of the rectifying slots of the conveyor cavities as they pass the shoulder forming interruption in said rail, and means to apply suction to said air flow passage to induce air flow therethrough and through the cavities for tilting the capsules therein.

11. Apparatus as set forth in claim 10 in which said air flow passage forms a scagg-removal passage, and scagg collection means to which said passage is connected.

12. Apparatus as set forth in claim 9 wherein the last-named means comprises means for engaging capsule bodies projecting into said rectifying slots and disposed in converging relation with the conveyor path to urge the capsules toward said opposite endwise orientation.

13. Apparatus as set forth in claim 9 wherein the capsule-supporting surface of the rail at said shoulder is spaced from the slot-defining side edges a distance such that the rail supports the capsules with their sides above and out of contact with said side edges, whereby the capsules will at least initially tip about the abrupt shoulder free of engagement with the side edges.

14. Apparatus for presenting medicinal capsules in uniform endwise orientation, comprising
a series of conveyr elements, each having a cavity therein for loosely receiving an individual capsule, and forming at one side of the cavity a rectifying slot defined by side edges spaced to pass a capsule body but retain a capsule cap,
a rail over which the conveyor elements move, said rail being interrupted to define an abrupt shoulder, the rail ahead of said shoulder being disposed to bridge the slot opening of a cavity and support a capsule therein with its sides above and out of contact with the slot-defining side edges,
the conveyor elements moving across said shoulder through an intermediate position in which an improperly oriented capsule in a cavity will have its cap end supported by said rail shoulder and its body end projecting unsupported beyond the shoulder,
and means to induce air flow through the slot against the unsupported end of the capsule in said intermediate position to cause the capsule to tilt about the shoulder to carry its body end into the slot and its cap end into supporting engagement with the side edges defining the slot.

* * * * *